Patented Jan. 9, 1923.

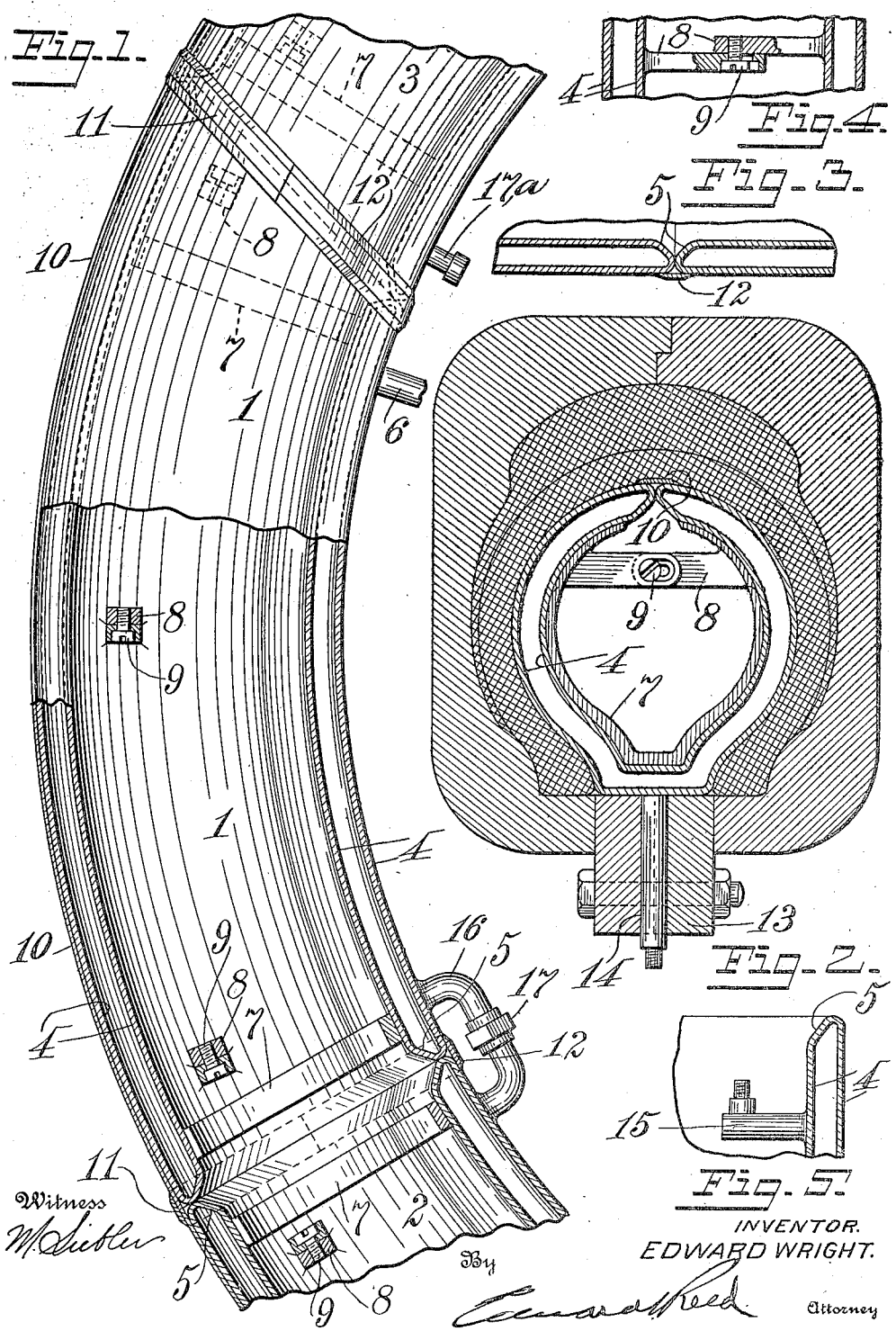

1,441,649

UNITED STATES PATENT OFFICE.

EDWARD WRIGHT, OF DAYTON, OHIO.

EXPANSIBLE METALLIC CORE FOR CURING PNEUMATIC TIRES.

Application filed November 6, 1920. Serial No. 422,161.

*To all whom it may concern:*

Be it known that I, EDWARD WRIGHT, a citizen of the United States, residing at Dayton, in the county of Montgomery and State of Ohio, have invented certain new and useful Improvements in Expansible Metallic Cores for Curing Pneumatic Tires, of which the following is a specification, reference being had therein to the accompanying drawing.

This invention relates to an expansible metallic core for curing or vulcanizing pneumatic tires and the like.

In the manufacture of pneumatic tires it has been common practice to cure the same on an "air bag" which consists of a flexible annular tube adapted to be inserted in the carcass of the tire and to receive fluid under pressure, such as steam, which expands the same within the carcass. These bags, or flexible cores, are open to several objections among which are the expense involved in constructing the same and the very short life of the bags. It has been proposed to provide an expansible metal bag having a longitudinally extending reentrant portion which will permit the metal bag to expand. In the case of a metal bag, however, it is necessary that the core be made in a plurality of segmental sections to permit the same to be collapsed for removal from the tire. Each section being a complete unit in itself must have its ends closed and the closures, or end walls, interfere with or entirely prevent the expansion of the core sections at their ends. Consequently, with these cores each section will have a relatively large expansion midway between its ends with very little or no expansion at the extreme ends thereof, which renders the core objectionable in practice.

The object of the present invention is to provide a metallic core, each section of which will have substantially uniform expansion throughout its length.

A further object of the invention is to provide an expansible core of such a character that the tire may be built up on the core and cured thereon.

A further object of the invention is to provide a core of this character which will be simple in its construction, inexpensive to manufacture, and which will have a long life.

Other objects of the invention will appear as the device is described in detail.

In the accompanying drawings Fig. 1 is a side elevation, partly in section, of a portion of an expansible metallic core embodying my invention; Fig. 2 is a sectional view taken transversely of such a core showing the same within the tire and the tire within the mold; Fig. 3 is a sectional view showing the manner of bridging the joints between adjacent core sections; Fig. 4 is a sectional detail view showing the stops to limit the expansion of the core; and Fig. 5 is a fractional detail view of a portion of a core section showing a modified arrangement of the inlet tube.

In these drawings I have illustrated one embodiment of my invention and have shown the core as comprising a plurality of segmental sections, one full section, 1, and parts of two sections, 2 and 3, being shown in Fig. 1. The several sections are adapted to be arranged end to end to form a complete annular core. In order that the core may be collapsed, one section is formed of a wedge shape so that it can be withdrawn inwardly from the tire, and in Fig. 1 I have shown the section 3 and the adjacent end of the section 1 as having their ends oblique, or non-radial, and it will be understood that the opposite end of Fig. 3 is inclined in the opposite direction from that shown in Fig. 1 so that the section can be withdrawn after the manner of a wedge.

Each segmental section, or unit, of the core comprises a tubular structure, or body portion, having hollow walls which form fluid tight chambers. The side walls 4 of the structure are curved to conform them substantially to the contour of the interior of the tire to be cured and the closed outer edges of the side walls are arranged adjacent one to the other, preferably along the center line of the tread of the tire. The side walls are preferably connected one to the other at their inner ends and, as shown in Fig. 2, the side walls are connected by a transverse wall 5, the ends of which are in open communication with the side walls, thus uniting the interiors of all the walls to form a single fluid tight chamber. Fluid under pressure, such as steam, may be admitted to this chamber in any suitable manner and, as here shown, I have provided the same with an inlet tube, or valved nipple, 6 of ordinary construction. The hollow walls of the several sections of the annular core may be wholly disconnected one from the other and air admitted to each section of the core through an individual nipple 6 but, in the present construction, I have shown the hollow walls of the several cores connected one to the other by suitable conduits or tubes 16 extending therefrom near the ends of the sections and connected one to the other by a union 17 to permit them to be readily disconnected. In this manner the steam may be admitted to one section and will circulate from section to section about the entire core. A suitable outlet is provided for the steam and in the present drawings this is shown as a valve controlled outlet pipe 17ª. When fluid under pressure is introduced into the hollow walls of the core it will tend to move the closed end portions of the side walls apart and to thus expand the core. Inasmuch as the space between the side walls of the core does not contain a fluid it need not be closed and I prefer to leave the ends of each section open. Consequently, there are no end walls, or other end structure, to interfere with the free expansion of the end portions of the sections. The closed ends of the walls will offer some slight resistance to the expansion of the end portions of the wall but this resistance is minimized by flaring the ends of the walls outwardly, as shown in Figs. 1 and 3. Consequently, each core section will have a substantially uniform expansion throughout its length. If, under certain conditions, it should be found that the end portions of the core do not expand with the same freedom as the intermediate portion thereof the expansion of the ends may be increased by inserting therein springs 7 which will act on the end portions of the core to expand the same but which will not be of sufficient strength to expand the core in the absence of fluid pressure. When the core is subjected to the action of fluid under pressure the pressure of the springs on the end portions of the core sections will serve to increase the expansion of the end portions thereof sufficiently to make it uniform with the expansion of the intermediate portion.

When the core is subjected to the action of fluid under pressure it will be apparent that the outer edge portions of the side walls will expand to a greater extent than will the inner portions thereof and I prefer, therefore, to provide stops which will check the expansion of the edge portions of the side walls when these have expanded to a predetermined extent. When the expansion of the outer portions of the side walls has been interrupted the action of the fluid will tend to further expand the inner portions thereof, thus causing the whole of the core to be expanded to the desired extent. The stops may be of any suitable character and, as here shown, they comprise arms 8 which are rigidly secured at their outer ends to the respective side walls 4, near the outer edges thereof, and the inner ends of which overlap and are connected one to the other by a pin and slot connection 9, as shown in Fig. 2, the length of the slot being equal to the amount of expansion it is desired to impart to this portion of the core. The space between the closed edges of the side walls may be bridged by a strip of metal, or the like, 10, which is rigidly secured along one edge, preferably by brazing, to one of the side walls, and the other edge of which overlaps the other side wall and bears tightly against the same. The strip 10 is of thin material and the lateral portions thereof are tapered to feather edges so that it forms but a small projection on the surface of the core. The joints between the ends of adjacent sections are bridged in much the same manner but in this instance the bridging strip is divided horizontally into two parts, one of the parts, as shown at 11, being rigidly secured to the end of one section and overlapping the adjacent section, while the edge of the other portion, or strip, 12 is rigidly secured to the last mentioned section and overlaps the first mentioned section. In the case of the wedge shaped sections 3 it is, of course, necessary that the inner guard strip 12 should be rigidly secured to and carried by the wedge shaped section so that it can move inwardly therewith.

The several sections of the core may be connected one to the other and held in their proper relative positions in any suitable manner, but in the device here shown I have provided a two part clamping ring 13 having an exterior diameter which will cause it to fit snugly against the inner walls of the core sections when these are in their properly assembled positions. The clamping ring may be attached to the cores in any suitable manner, as by causing the same to engage suitable projections from the core and, in the present instance, I have provided the two parts of the clamping ring with recesses 14 adapted to receive the tubes 6 and 16 of the several sections, and to clamp these tubes between the two parts of the ring, thus attaching the ring firmly to the several sections of the core and retaining these sections rigidly in their properly assembled positions.

Where such a core is to be used for repair purposes a single section, or unit, may be employed. This unit need not differ in any way from the units of the annular core but I prefer that the inlet tube, or nipple, be arranged within the tubular structure instead of exterior thereof, as shown at 15 in Fig. 5. In this way the nipple is arranged in a position where it is not liable to injury due to the rough handling of the core and in which it will not interfere with the use of the vulcanizing molds, which usually extend entirely about the tire.

The operation of the device will be readily understood from the foregoing description of the several parts thereof, and it will be apparent that I have provided a metallic core, each section of which will have substantially uniform expansion throughout the length thereof and which will expand not only at the joints between the side walls but throughout the area of the side walls. Further, it will be apparent that the device is very simple in its construction and that it will have a relatively long life inasmuch as the material and construction are such that it will not rapidly deteriorate from use.

It will be understood that the core is formed of thin sheet metal and that in the present drawings the thickness of this metal has been exaggerated in order to facilitate the illustration of the device.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a vulcanizing core, a structure having a hollow curved wall forming a fluid tight chamber, and means to introduce fluid under pressure into said chamber.

2. In a vulcanizing core, a structure having a hollow curved wall forming a fluid tight chamber, the ends of said hollow wall being free to move, and means to introduce fluid under pressure into said chamber.

3. In a vulcanizing core, a structure having oppositely curved hollow walls arranged with their adjacent edges parallel, and means to introduce fluid under pressure into said hollow walls.

4. In a device of the character described, a tubular structure having hollow walls shaped to conform to the interior of a tire, said walls having their longitudinal closed edges arranged adjacent one to the other but unconnected to permit of the relative movement thereof, and means to introduce fluid under pressure into said hollow walls.

5. In a device of the character described, a tubular structure open at its ends and having hollow walls shaped to conform to the interior of a tire, the longitudinal closed edges of said walls being arranged adjacent one to the other and being capable of relative movement, and means to introduce fluid under pressure into said hollow walls.

6. In a device of the character described, a tubular structure open at its ends and having curved hollow walls forming fluid tight chambers, the adjacent edges of said walls being movable relatively one to the other, and means to introduce fluid under pressure into said walls.

7. In a device of the character described, a tubular structure open at its ends and having curved hollow walls forming fluid tight chambers, the adjacent edges of said walls being movable relatively one to the other, means to introduce fluid under pressure into said walls, and means to limit the relative movement of said walls.

8. In a device of the character described, a tubular structure open at its ends and having curved hollow walls forming fluid tight chambers, the adjacent edges of said walls being movable relatively one to the other, means to introduce fluid under pressure into said walls, and stops carried by said walls near the adjacent edges thereof to limit the relative movement of said walls.

9. In a device of the character described, a plurality of segmental sections adapted to be arranged end to end to form an annulus, each section comprising a tubular structure open at its ends and having curved hollow walls forming fluid tight chambers, the adjacent edges of said walls being movable relatively one to the other, an inlet tube extending inwardly from each of said sections and communicating with the respective hollow walls, and clamping rings embracing said inlet tubes and fitting against the inner edges of the several sections of said device.

10. In a device of the character described, a tubular structure open at its ends and having curved hollow walls forming fluid tight chambers, the adjacent edges of said walls being movable relatively one to the other, a guard strip carried by one of said walls near the edge thereof and overlapping the adjacent edge of the other wall, and means for introducing fluid under pressure into said walls.

11. In a device of the character described, a plurality of sections arranged end to end and each comprising a tubular structure open at its ends and having curved hollow walls forming fluid tight chambers, the adjacent edges of said walls being movable relatively one to the other, means to introduce fluid under pressure into said walls, a guard strip carried by the outer portion of the end of one section and adapted to overlap the end of the adjacent section, and a second guard strip carried by the inner portion of the end of said second section and adapted to overlap the inner portion of the first mentioned section.

12. In a device of the character described, a tubular structure open at its ends and having curved hollow walls forming fluid tight chambers, the adjacent edges of said walls being movable relatively one to the other, and an inlet nipple mounted within said tubular structure and communicating with said fluid tight chambers.

13. In a vulcanizing core, an arcuate tubular structure having hollow walls shaped to conform to the interior of a tire, said hollow walls having their longitudinal closed edges arranged adjacent one to the other along the outer circumference of said structure and capable of movement relatively one to the other throughout the length of said structure, and means to introduce fluid under pressure into said hollow walls.

14. In a vulcanizing core, an arcuate tubular structure having hollow walls shaped to conform to the interior of a tire, said hollow walls having their longitudinal closed edges arranged adjacent one to the other along the outer circumference of said structure and each of said walls having its inner and outer members connected directly one to the other at their respective ends, whereby said walls are capable of relative movement throughout the length of said structure, and means to introduce fluid under pressure into said hollow walls.

15. An expansible core for tires, an arcuate tubular body having hollow walls, said tubular hollow walled body being longitudinally split upon the external circumferential side whereby the respective sides of the member are separable under the influence of internal pressure, and means for applying internal pressure to expand the core.

16. An expansible core for tires comprising a substantially tubular arcuate shell longitudinally slotted upon its outer face, the separated portions of the shell being laterally deflectable under the influence of internal pressure, and means for applying internal pressure thereto.

17. An expansible core for tires comprising an arcuate member longitudinally bifurcated on its convex face, the bifurcated portions being inturned and terminating in proximity one to the other, and pressure applying means for deflecting said bifurcated portions laterally.

18. An expansible core for tires comprising an arcuate tubular member conforming substantially to the interior of a tire, said tubular member being longitudinally split in that portion contiguous to the tread portion of the tire to form relatively adjustable wings, and means for applying pressure for distending said wings.

19. An expansible core for tires comprising an arcuate member having two relatively movable inturned wing portions approximately meeting at a point contiguous to the tread portion of the tire, and means for applying pressure to said member for flexing the wing portions thereof outwardly.

20. An expansible core for tires comprising an arcuate member having two relatively movable inturned wing portions approximately meeting at a point contiguous to the tread portion of the tire, one of the wing portions having thereon an extension overhanging the other wing portion, and means for applying pressure to said member to flex said wing portions outwardly.

21. An expansible core for tires comprising an arcuate member longitudinally bifurcated in its convex face, the bifurcated portions being inturned and overlapping one upon the other, and means for applying pressure to outwardly flex the inturned portions.

22. An expansible core for tires comprising an arcuate tubular member substantially conforming to the interior of a tire, said tubular member being longitudinally split in that portion contiguous to the tread of the tire to form relatively adjustable inturned wings overlapping one upon the other, and means for applying pressure to flex said wings outwardly.

In testimony whereof, I affix my signature hereto.

EDWARD WRIGHT.